US009582344B2

(12) United States Patent
Chen et al.

(10) Patent No.: US 9,582,344 B2
(45) Date of Patent: Feb. 28, 2017

(54) PREDICTING ANOMALIES AND INCIDENTS IN A COMPUTER APPLICATION

(71) Applicant: International Business Machines Corporation, Armonk, NY (US)

(72) Inventors: Wei Ye Chen, Beijing (CN); Juhnyoung Lee, Yorktown Heights, NY (US); Feng Li, Beijing (CN); Qi Cheng Li, Beijing (CN); Shao Chun Li, Beijing (CN); Rong Liu, Beijing (CN); Li Jun Mei, Beijing (CN); Wei Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 14/604,830

(22) Filed: Jan. 26, 2015

(65) Prior Publication Data

US 2015/0212869 A1 Jul. 30, 2015

(30) Foreign Application Priority Data

Jan. 28, 2014 (CN) .......................... 2014 1 0041267

(51) Int. Cl.
*G06F 11/00* (2006.01)
*G06F 11/07* (2006.01)
*G06F 11/34* (2006.01)

(52) U.S. Cl.
CPC ........ *G06F 11/0706* (2013.01); *G06F 11/008* (2013.01); *G06F 11/34* (2013.01); *G06F 11/3452* (2013.01); *G06F 11/3466* (2013.01)

(58) Field of Classification Search
CPC ................. G06F 11/3452; G06F 11/34; G06F 2201/865; G06F 11/3466
See application file for complete search history.

(56) References Cited

U.S. PATENT DOCUMENTS 7,225,250 B1   5/2007 Harrop
8,812,586 B1 *  8/2014 Kulkarni ............... H04L 41/069
                                                                709/203
(Continued)

OTHER PUBLICATIONS

List of IBM Patents or Patent Applications Treated as Related; CN920130179US1, Date Filed: Jan. 26, 2015, pp. 1-2.
(Continued)

*Primary Examiner* — Charles Ehne
(74) *Attorney, Agent, or Firm* — Cantor Colburn LLP; David Quinn

(57) ABSTRACT

A method for predicting anomalies in a computer application includes during runtime of the computer application, detecting traffic metrics and incident tickets associated with the computer application, the incident ticket indicating an incident might occur in the computer application; calculating a threshold based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized; obtaining predicted metrics of the computer application in a next time period based on the traffic metrics; and in response to an absolute value of a second order difference associated with the predicted metrics exceeding the threshold, predicting potential anomalies of the computer application in the next time period.

10 Claims, 9 Drawing Sheets

(56) References Cited

U.S. PATENT DOCUMENTS

| | | | |
|---|---|---|---|
| 2006/0020924 A1* | 1/2006 | Lo ..................... | G06F 11/0709 |
| | | | 717/127 |
| 2008/0262990 A1* | 10/2008 | Kapoor .................. | G06F 9/505 |
| | | | 706/20 |
| 2011/0019566 A1* | 1/2011 | Leemet .................. | H04L 12/14 |
| | | | 370/252 |
| 2014/0310714 A1* | 10/2014 | Chan ................. | G06F 17/30598 |
| | | | 718/102 |
| 2015/0212869 A1* | 7/2015 | Chen .................. | G06F 11/0706 |
| | | | 714/38.1 |

OTHER PUBLICATIONS

Wei Ye Chen, et al.,": Predicting Anomalies and Incidents in a Computer Application," U.S. Appl. No. 14/745,969, filed Jun. 22, 2015.

VMware, Inc., "Proactive Incident and Problem Managment," VMWARE White Paper, VMWare, Inc., 2012, pp. 1-17.

Wikipedia, [online]; [retrieved on Jan. 25, 2015]; retrieved from the Internet http://en.wikipedia.org/wiki/Multi_Router_Traffic_Grapher Wikipedia, "Multi Router Traffic Grapher," Wikimedia Foundation, Inc., Jul. 2014, pp. 1-3.

* cited by examiner

PREDICTING ANOMALIES AND INCIDENTS IN A COMPUTER APPLICATION

FOREIGN PRIORITY

This application claims priority to Chinese Patent Application No. 201410041267.5, filed Jan. 28, 2014, and all the benefits accruing therefrom under 35 U.S.C. §119, the contents of which in its entirety are herein incorporated by reference.

BACKGROUND

Various embodiments of the present invention relate to the management and maintenance of a computer application, and more specifically, to a method and apparatus for predicting anomalies and incidents in a computer application.

With the development of computer hardware and software technology, various computer applications are able to support people's production and life in various aspects. However, as functions of computer applications get increasingly complex and the number and kinds thereof increase continuously, many problems might occur when managing and maintaining computer applications. For example, multiple computer applications that are independent of each other or have a dependence relationship (e.g., call relationship) among them might be running on one or more physical devices. How to ensure these computer applications to be in a healthy running state now becomes a focus of attention.

A common solution is as below: when incidents occur in a computer application, only after a given time interval users of the computer application discover that the computer application has problems, and then these users may report the problems to a provider of the computer application by telephone, email or other means.

Nowadays it is found that anomalies in traffic metrics associated with a computer application might have some association with incidents of the computer application. For example, constant interruptions and re-connections of a network connection might indicate network adapter incidents. Therefore, a problem exists with respect to how to predict potential anomalies in future and further discover causes behind anomalies (e.g., network adapter incidents, etc.). However, currently there lacks a method capable of conveniently and accurately predicting an anomaly and incident in a computer application.

Note typically users of a computer application submit an incident ticket upon discovering a traffic anomaly, but an association relationship between the anomaly and incident is unclear. For example, users' feedback often has a lag; for another example, daily maintenance operations performed by the provider of a computer application (e.g., updating or upgrading application packages, etc.) might cause some traffic anomalies (however, these anomalies confronted with users are not caused by incidents); still for another example, some errors in manual operations also might lead to a confusing an association relationship between anomalies and incidents. Therefore, how to predict an anomaly and incident in a computer application becomes a focus of attention.

SUMMARY

In one embodiment of the present invention, there is provided a method for predicting anomalies in a computer application, the method including during runtime of the computer application, detecting traffic metrics and incident tickets associated with the computer application, the incident ticket indicating an incident might occur in the computer application; calculating a threshold based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized, the recall rate $R_{recall}$ describing a ratio of the number of incident tickets causing the computer application to be recalled to the total number of the incident tickets; obtaining predicted metrics of the computer application in a next time period based on the traffic metrics; and in response to an absolute value of a second order difference associated with the traffic metrics exceeding the threshold, predicting potential anomalies of the computer application in the next time period.

In one embodiment of the present invention, the threshold is such that when the absolute value of the second order difference associated with the traffic metrics exceed the threshold, a precision rate $R_{precision}$ that the computer application is recalled is maximized, the precision rate $R_{precision}$ describing a ratio of the number of anomalies causing the computer application to be recalled to the number of all anomalies of the computer application.

In one embodiment of the present invention, there is provided an apparatus for predicting anomalies in a computer application, comprising: a detecting module configured to, during runtime of the computer application, detect traffic metrics and incident tickets associated with the computer application, the incident ticket indicating an incident might occur in the computer application; a calculating module configured to calculate a threshold based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized, the recall rate $R_{recall}$ describing the ratio of the number of incident tickets causing the computer application to be recalled to the total number of the incident tickets; an obtaining module configured to obtain predicted metrics of the computer application in a next time period based on the traffic metrics; and a predicting module configured to, in response to an absolute value of a second order difference associated with the traffic metrics exceeding the threshold, predict potential anomalies of the computer application in the next time period.

In one embodiment of the present invention, the threshold is such that when the absolute value of the second order difference associated with the traffic metrics exceeds the threshold, a precision rate $R_{precision}$ that the computer application is recalled is maximized, the precision rate $R_{precision}$ describing the ratio of the number of anomalies causing the computer application to be recalled to the number of all anomalies of the computer application.

In one embodiment of the present invention, there is provided a method for predicting incidents in a computer application, comprising: during runtime of the computer application detecting anomalies and incident tickets associated with the computer application; building an incident prediction model based on the anomalies and the incident tickets, the incident prediction model describing an association rule among the anomalies and the incident tickets; predicting potential anomalies of the computer application in a next time period according to the above method; and predicting potential incidents of the computer application in the next time period based on the incident prediction model and the potential anomalies.

In one embodiment of the present invention, there is provided an apparatus for predicting incidents in a computer application, comprising: a detecting module configured to, during runtime of the computer application detect anomalies and incident tickets associated with the computer application; a building module configured to build an incident prediction model based on the anomalies and the incident tickets, the incident prediction model describing an association rule among the anomalies and the incident tickets; an anomaly predicting module comprising the aforesaid apparatus for predicting anomalies in a computer application and configured to predict potential anomalies of the computer application in a next time period; and an incident predicting module configured to predict potential incidents of the computer application in the next time period based on the incident prediction model and the potential anomalies.

By means of the methods and apparatuses of the present invention, anomalies and incidents that might occur in the computer application in future runtime can be predicted more rapidly and precisely while historical traffic metrics and incident tickets of the computer application in previous runtime are taken into full consideration.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
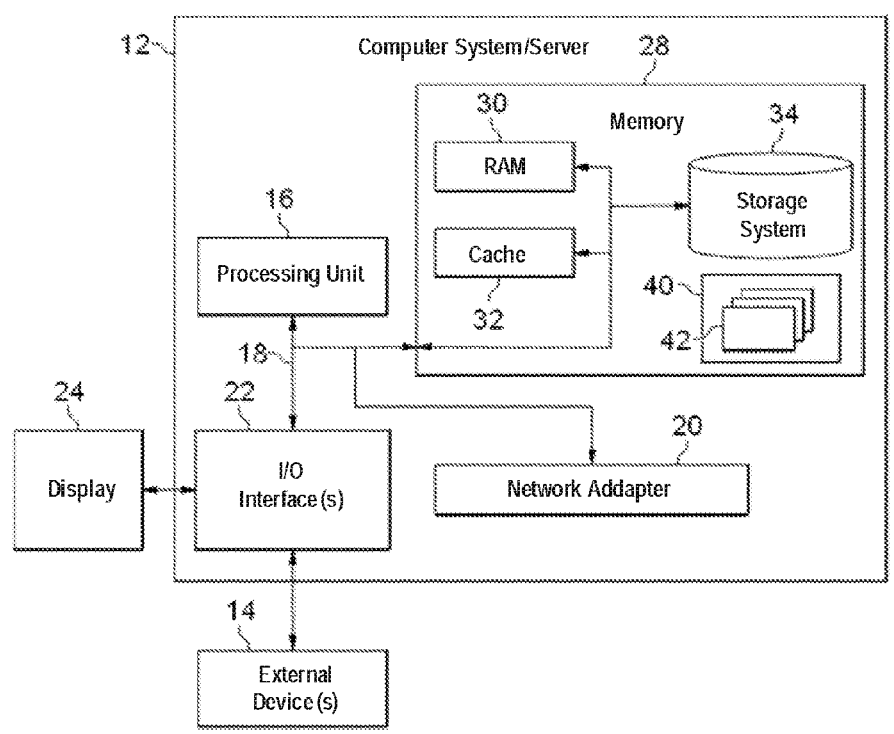
FIG. 1 shows an exemplary computer system/server 12 which is applicable to implement the embodiments of the present invention.

In view of the above, it is desired to develop a technical solution that can precisely and efficiently predict anomalies in a computer application; it is desired the technical solution can build an anomaly prediction model by taking into full consideration of a relationship among anomalies and incident tickets in traffic metrics during previous runtime of the computer application and the relationship among anomalies and incident tickets actually occurring during previous runtime of the computer application, and by selecting appropriate parameters, enable the anomaly prediction model to provide as precise prediction results as possible. On the other hand, it is further desired to develop a technical solution that can further predict potential incidents in the computer application based on potential anomalies in the computer application.

Exemplary embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It should be noted in the context of the present invention a computer application may refer to a software program running on a computer device or the computer device per se (e.g., server). For the purpose of clarity, first an introduction is presented below to the meaning of various technical terminology used throughout the present invention.

An incident ticket refers to a report that is submitted to the provider of a computer application and reflects a problem/error occurring in the computer application. The incident ticket may include a plurality of attributes such as problem abstract, problem description, occurring time, etc., and may have various forms. Table 1 below schematically shows an exemplary representation of an incident ticket from a user of a computer application. Those skilled in the art may understand the incident ticket may further include even more or less information based on concrete application environment.

TABLE 1

Incident Ticket

| Attributes | Value |
|---|---|
| Incident ID | IN1 |
| Problem Abstract | ServerXYZ Issue: network connectivity has been lost |
| Problem Description | Ticket No.: Server 1; Application: Application 1; ... |
| Occurring Time | 2013-12-25, 08:28:00 |
| Solved Time | 2013-12-25, 09:25:40 |
| ... | ... |

Traffic metrics refers to a measurement parameter that is associated with the status of a computer application during runtime of the computer application, such as CPU usage rate, memory usage rate, workload, network connection, data transmission rate, etc. For more details, reference may be made to http://en.wikipedia.org/wiki/Multi_Router_Traffic_Grapher.

Figure 2A:
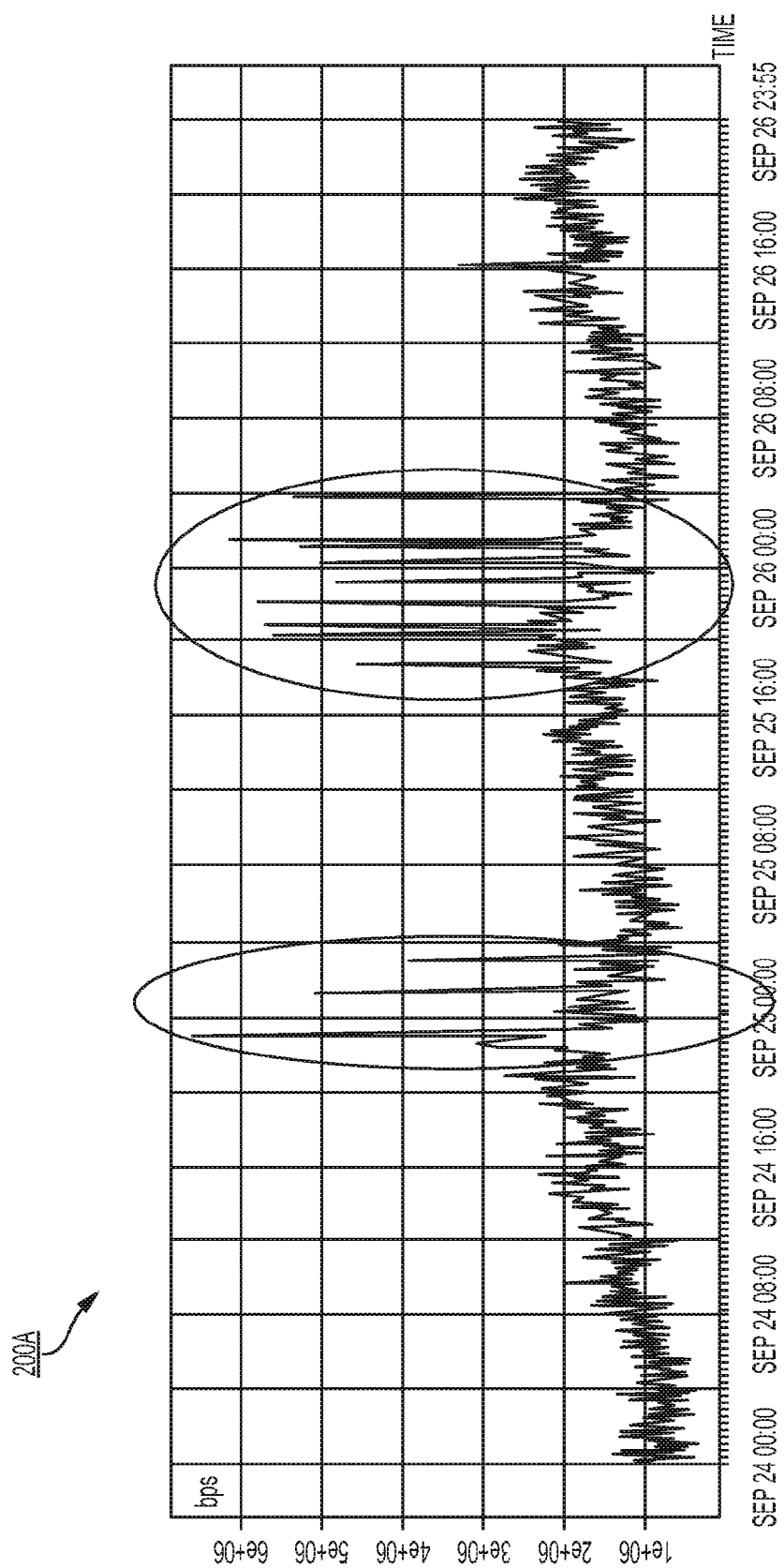
FIGS. 2A and 2B schematically show diagrams of anomalies that might occur in traffic metrics during runtime of a computer application.
Figure 2B:
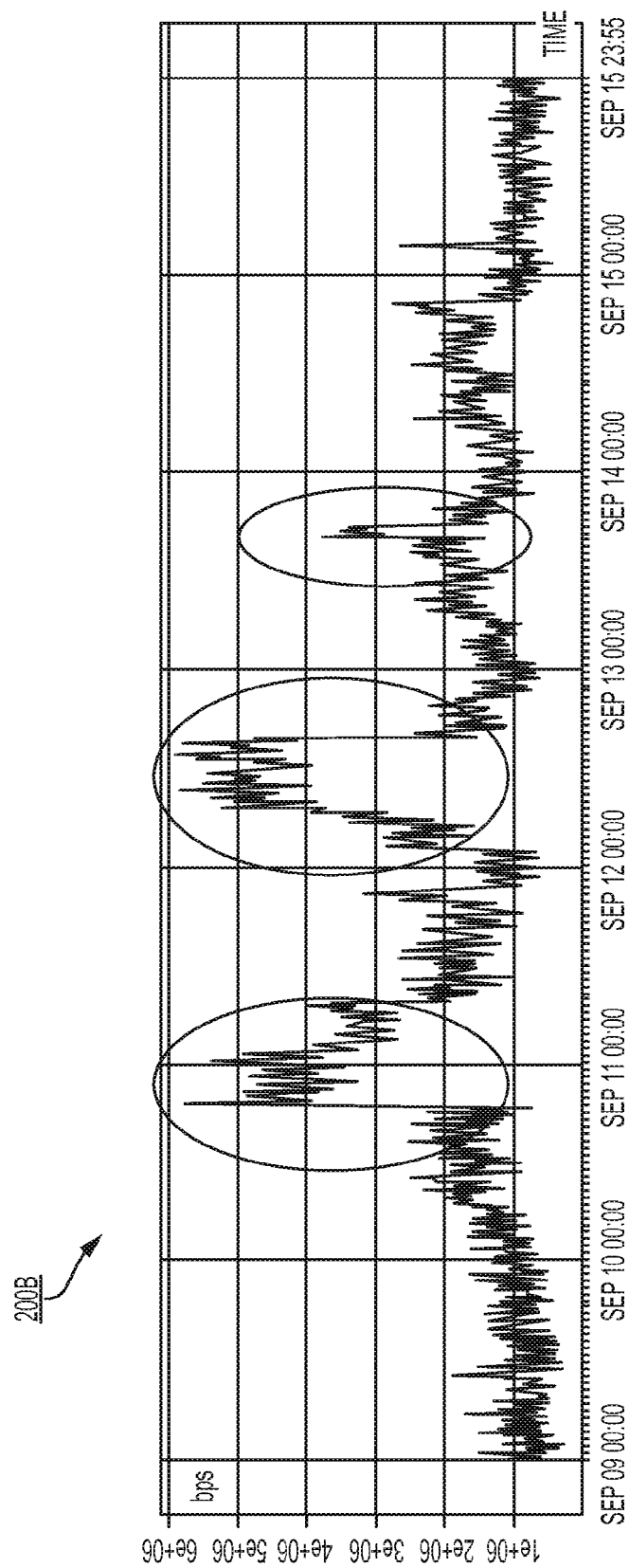

Anomalies in traffic metrics refer to data in traffic metrics, which does not satisfy conventional distribution rules. Specifically, FIGS. 2A and 2B schematically show diagrams 200A and 200B of anomalies that possibly occur in traffic metrics during runtime of a computer application.

Those skilled in the art should note during runtime of a computer application, values of traffic metrics usually vary with measurement times but remain in a certain range. FIG. 2A schematically shows a waveform graph that data transmission rate varies with time. As shown in FIG. 2A, the majority of measurement values of the data transmission rate remain a range of $0-3\times10^6$ bps, wherein only in areas around time points "Sep 25 00:00" and "Sep 26 00:00" (shown in ellipse areas) measurement values change sharply. FIG. 2B schematically shows another waveform graph that data transmission rate varies with time. In this figure, changes beyond a normal fluctuation range also occur among measurement values of the data transmission rate. Therefore, circumstances shown in ellipse areas in FIGS. 2A and 2B belong to anomalies in traffic metrics. According to existing technical solutions, however, it is hard to define the bounds between "slight fluctuations (normality)" and "sharp changes (anomalies)" in traffic metrics.

To solve the drawbacks in the prior art, the various embodiments of the present invention propose a novel architecture for predicting an anomaly and incident in a computer application. Specifically, FIG. 3 schematically shows an architecture diagram of a technical solution for predicting an anomaly and incident in a computer application according to one embodiment of the present invention.

Figure 3:
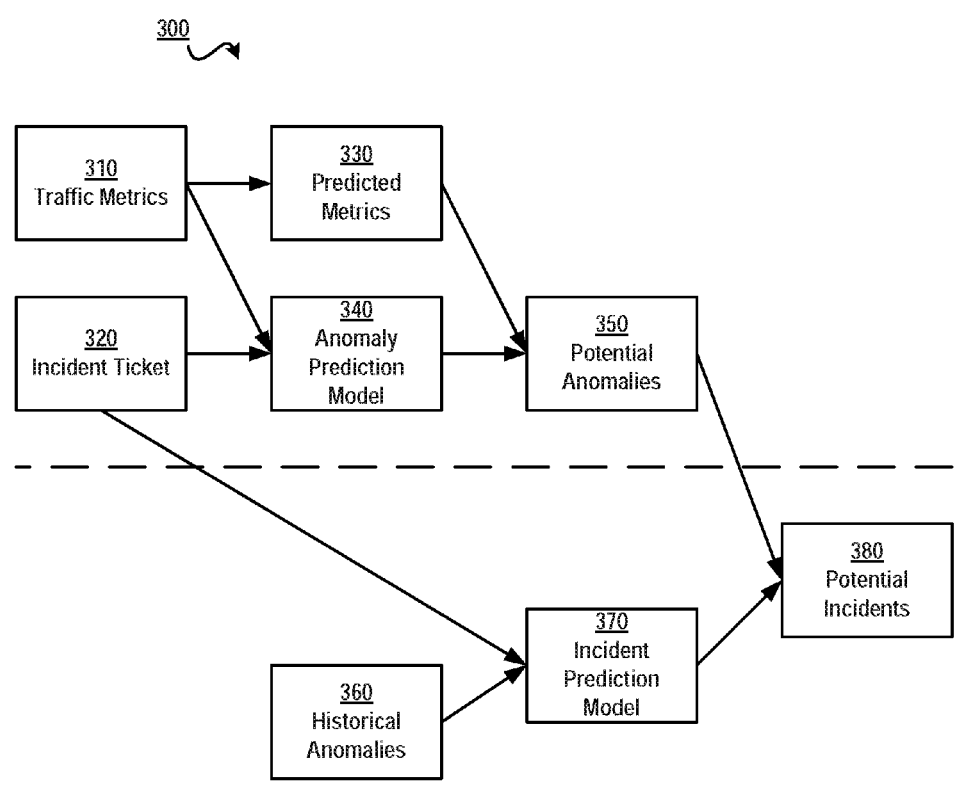
FIG. 3 schematically shows an architecture diagram of a technical solution for predicting anomalies and incidents in a computer application according to one embodiment of the present invention.

As shown in FIG. 3, a block diagram above a dashed line shows an architecture diagram of a technical solution for predicting an anomaly in a computer application. During runtime of the computer application, an incident ticket 320 and traffic metrics 310 associated with the computer application may be detected and stored. Subsequently, an anomaly predicting model 340 may be built based on the detected traffic metrics 310 and incident ticket 320. In this embodiment, anomaly predicting model 340 may include a threshold for judging anomalies (i.e., when the traffic metrics is higher than the threshold, it is considered that an anomaly occurs in the traffic metrics), and based on collected historical data, the threshold can maximize recall accuracy and recall rate that the computer application is recalled. In addition, by means of data mining techniques, prediction metrics 330 (i.e., predicted values of the traffic metrics) possibly occurring in next time period can be predicted based on traffic metrics 310. Then, potential incidents 350 possibly occurring in the next time period can be predicted based on the incident prediction model 340 and the potential metrics 330.

As shown in FIG. 3, a portion below the dashed line shows an architecture diagram of a technical solution for predicting an incident in a computer application. Specifically, an incident predicting model 370 (the incident predicting model 370 describes an association relationship between incident tickets and historical anomalies, i.e., in what abnormal circumstances incidents might occur) may be built by means of data mining and based on collected incident ticket 320 and historical anomalies 360. Next, a potential incident 380 that possibly occurs in the computer application can be predicted based on potential anomaly 350 and generated incident predicting model 370.

According to the technical solution of the present invention, the provider of the computer application can take repair measures specifically according to predicted anomalies and incidents before the user of the computer application finds adverse consequences caused by incidents and submit incident tickets to the provider of the computer application. Specifically, user feedback lags behind the occurrence of an incident. Suppose usually several hours after an incident occurs the user discovers adverse consequences resulting from the incident. If the provider of the computer application finds out and fixes the incident within 1 hour of the incident according to prediction, then the user does not have to submit an incident ticket to the provider. In this manner, the response speed of the computer application provider to the incident can be increased, and the user experience can be improved.

Based on the principle described above, one embodiment of the present invention provides a method for predicting anomalies in a computer application, the method comprising: during runtime of the computer application, detecting traffic metrics and incident tickets associated with the computer application, the incident ticket indicating an incident might occur in the computer application; calculating a threshold based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized, the recall rate $R_{recall}$ describing a ratio of the number of incident tickets causing the computer application to be recalled to the total number of the incident tickets; obtaining predicted metrics of the computer application in a next time period based on the traffic metrics; and in response to an absolute value of a second order difference associated with the predicted metrics exceeding the threshold, predicting potential anomalies of the computer application in the next time period.

Figure 4:
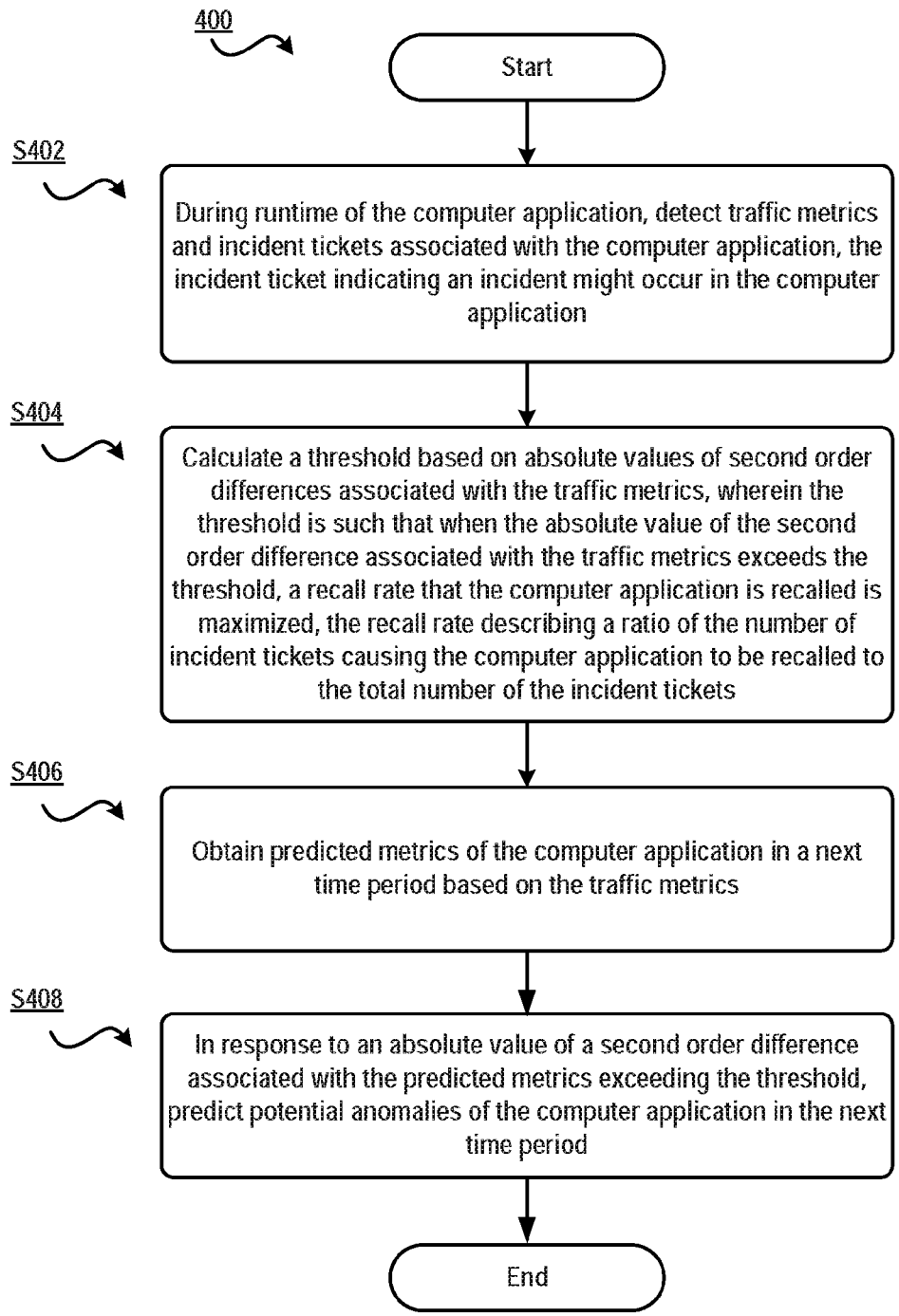
FIG. 4 schematically shows a flowchart of a method for predicting anomalies in a computer application according to one embodiment of the present invention.

Specifically, FIG. 4 schematically shows a flowchart 400 of a method for predicting anomalies in a computer application according to one embodiment of the present invention. First of all, in block S402, traffic metrics and incident tickets associated with the computer application are detected during runtime of the computer application, the incident ticket indicating an incident might occur in the computer application. It should be noted that usually the system cannot find all incidents in the computer application but only finds one part of incidents; in addition, the system might further submit some false incident tickets to the provider of the computer application. For example, the system finds an upsurge in memory usage rate and thinks the memory might have an incident, but the truth is the computation load of the computer application is quite large and more memory resources are needed. At this point, these "false" incident tickets may be considered false positive.

It should be noted that in the context of the present invention, traffic metrics may be detected at predetermined time intervals (e.g., once every 5 minutes), so the detected traffic metrics may be stored in the form of time series data. Specifically, various data structures for storing time series data which are currently known and to be developed in future may be used.

The traffic metrics and incident tickets detected in this step will be used for subsequent, further analysis so as to determine which traffic metrics belong to anomalies and determine those incident tickets indicating anomalies truly occur in the traffic metrics and cause the computer application to be recalled.

In block S404, the threshold is calculated based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized, the recall rate $R_{recall}$ describing the ratio of the number of incident tickets causing the computer application to be recalled to the total number of the incident tickets.

It should be noted that anomalies in traffic metrics do not necessarily have a direct cause-and-effect relationship with incidents, but some anomalies might be caused by previously occurring incidents (for example, network adapters cause network connection times to increase significantly). In addition, some anomalies in traffic metrics might not be caused by incidents but by other reasons such as server restart. Therefore, it is necessary to mine the relationship among anomalies and incidents and determine the demarcation point (i.e., the threshold) between anomalies and normality in traffic metrics.

In one embodiment of the present invention, an incident ticket resulting in recall may be defined as: an incident ticket that at least one anomaly occurs in a specific time period (e.g., 24 hours) before the user submits the incident ticket. Since the user finding a problem and submitting an incident ticket often lags behind the occurrence of the incident, the length of time period describing the lag may be defined freely.

Those skilled in the art should be noted that the threshold should cover as much recall as possible, i.e., should keep a large ratio of incident tickets causing recall to all incident tickets submitted by the user.

Specifically, the recall rate $R_{recall}$ may be calculated using an equation below:

$$R_{recall} = \frac{\text{amount of incident tickets causing computer application to be recalled}}{\text{total number of incident tickets}} \quad \text{Equation 1}$$

In one embodiment of the present invention, a value between the maximum of detected traffic metrics and the minimum of traffic metrics causing the computer application to be recalled may be selected as the threshold.

Next in block S406, predicted metrics of the computer application in a next time period are obtained based on the traffic metrics. Specifically, data mining techniques (e.g., moving average (MA), exponential smoothing (ES), auto regression (AR), ARIMA, etc.) may be used to predict predicted values of traffic metrics (i.e., predicted metrics) that might occur in the next time period based on the detected traffic metrics (may include detected historical data values and currently real-time detected data values).

In block S408, in response to an absolute value of a second order difference associated with the predicted metrics exceeding the threshold, potential anomalies of the computer application in the next time period are predicted. Since a threshold for judging abnormal values and normal values in traffic metrics has been determined in block S404, where an absolute value of a second order difference associated with the predicted metrics is higher than the threshold, it may be considered there exist anomalies in the traffic metrics of the computer application. When the minimum of traffic metrics of a computer application that is recalled is used as the threshold, the number of potential anomalies reaches the maximum, and the number of incident tickets generated at this point is quite large.

In one embodiment of the present invention, when the absolute of the second order difference associated with the traffic metrics exceeds the threshold, the threshold maximizes a precision rate $R_{precision}$ that the computer application is recalled, the precision rate $R_{precision}$ describing the ratio of the number of anomalies causing the computer application to be recalled to the total number of anomalies of the computer application.

It should be noted that setting the threshold as a low value means relaxing conditions for anomaly detection, i.e., traffic metrics that actually belong to a normal range might be identified as anomalies, and then excessive incident tickets might be generated. That is, the user might mistakenly regard normal circumstances as anomalies and submit requests for repair to the provider of the computer application. Specifically, for traffic metrics such as memory utility, suppose 60% is the threshold, then memory utility reaches 70%, then it is considered this circumstance belongs to anomalies.

It should be noted that 60% is merely an example of the demarcation point between normality and anomalies, but not a threshold within a value range of absolute values of second order differences of the traffic metrics. Those skilled in the art should understand when the absolute value of the second order difference of the traffic metrics is used as a measurement criterion of thresholds, the threshold may be a numeric value corresponding to 60%.

Therefore, to increase the precision of incident tickets, such a concept as precision rate is introduced to the embodiments of the present invention. It may be considered if there is at least one incident ticket within 24 hours since an anomaly occurrence, then the anomaly results in recall within limited latency, so the anomaly is precise, i.e., being an anomaly with an incident ticket. In this embodiment, the precision rate $R_{precision}$ may be calculated using an equation below:

$$R_{precision} = \frac{\text{amount of anomalies causing the computer application to be recalled}}{\text{number of all anomalies of the computer application}} \quad \text{Equation 2}$$

In one embodiment of the present invention, the traffic metrics comprise at least any one type of: CPU usage rate, memory usage rate, workload, network connection and data transmission rate. Those skilled in the art may further recognize since various types of traffic metrics may be comprised, each type of traffic metrics may be detected separately in detecting traffic metrics associated with the computer application. Multiple types of traffic metrics may be stored as the same time series data (i.e., each type of traffic metrics may act as a sub-data of the time series data). Specifically, the data structure of a data node in the time series data may be represented as <CPU usage rate, memory usage rate, workload, network connection, data transmission rate>. Or those skilled in the art may further use other modes for storage.

In one embodiment of the present invention, the calculating a threshold based on absolute values of second order differences associated with the traffic metrics comprises: aggregating the traffic metrics according to a predetermined time window interval so as to form standard metrics; and calculating the threshold based on absolute values of second order differences associated with the standard metrics.

In the context of the present invention, since the traffic metrics are time series data, when the time interval for collecting traffic metrics is short (e.g., 5 minutes and even a shorter time interval), heavy computations will be caused if prediction is conducted directly based on collected, raw traffic metrics. Therefore, first the traffic metrics may be aggregated according to predetermined time window intervals (e.g., half an hour), and subsequent prediction is conducted based on aggregated data, so as to reduce computations on the premise of retaining authenticity of the traffic metrics.

Next, a threshold may be calculated based on absolute values of second order differences associated with the standard metrics. By using a detection method based on absolute values of second order differences, anomalies in the standard metrics may be detected. Detailed description is presented below to an embodiment of the present invention with reference to FIGS. 5A to 5C. Specifically, FIGS. 5A to 5C schematically show schematic views 500A to 500C of calculating absolute values of second order differences associated with the traffic metrics according to one embodiment of the present invention.

Figure 5A:
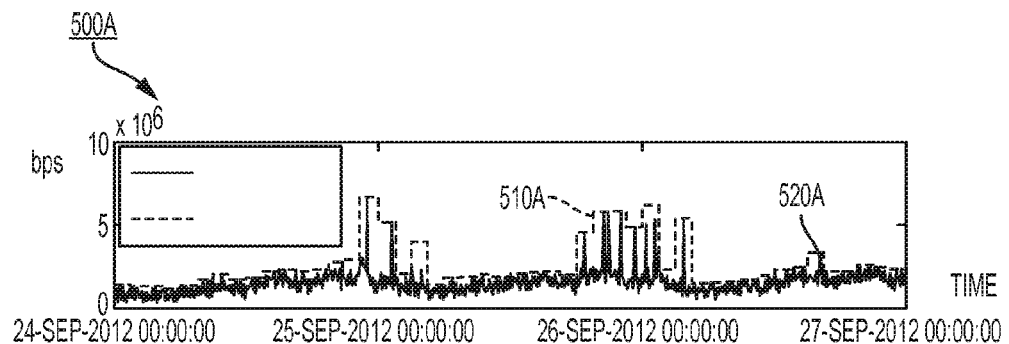
FIGS. 5A, 5B and 5C schematically show schematic views of calculating a threshold based on absolute values of second order differences associated with traffic metrics according to one embodiment of the present invention.
Figure 5B:
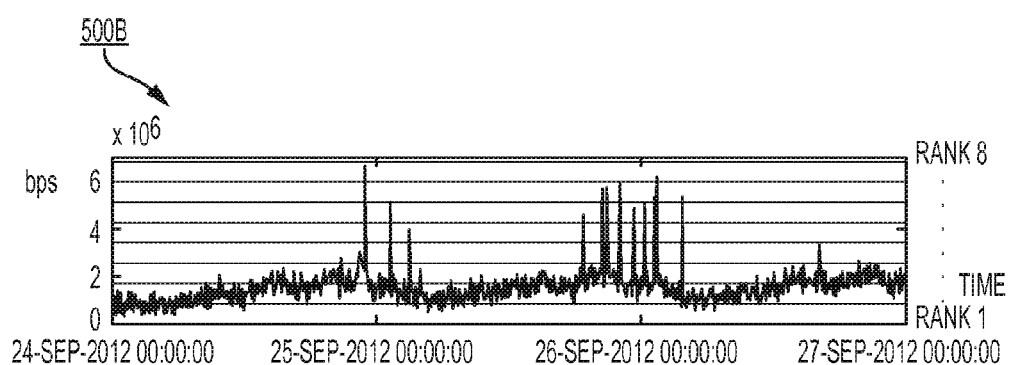

As shown in FIG. 5A, there is shown a diagram 500A of aggregating traffic metrics according to predetermined time window intervals so as to form standard metrics. For example, a curve waveform 510A in FIG. 5A represents traffic metrics detected every 5 minutes (in this embodiment, data transmission rates entering the server are used as a concrete example of the traffic metrics); a square wave 520 in FIG. 5A represents traffic metrics resulting from aggregating the traffic metrics as shown by curve waveform 510A according to a time window interval of 60 minutes.

Those skilled in the art may select an aggregation algorithm according to specific needs. For example, a maximum value of traffic metrics within a time window of 60 minutes may be used as a value of the aggregated standard metrics; or an average value of traffic metrics within a time window of 60 minutes may be used as a value of the aggregated standard metrics. Through the aggregation operation, the data amount of to-be-analyzed traffic metrics may be reduced greatly while raw data of traffic metrics may be maintained approximately.

Figure 5C:
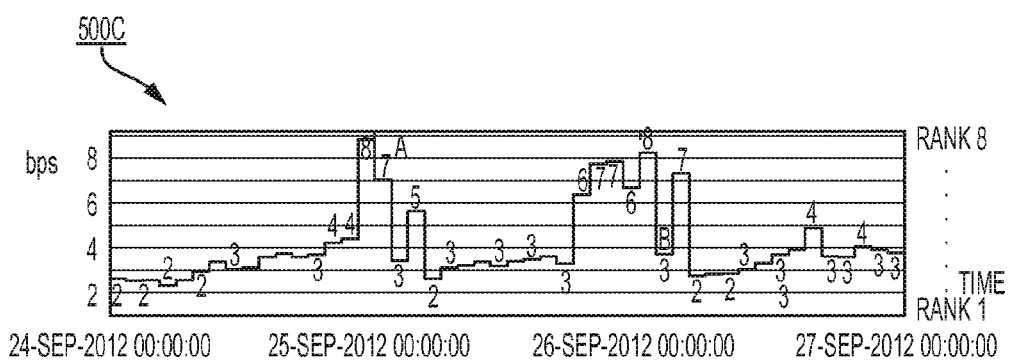

Before describing FIG. 5C in detail, an introduction is first given to an optional step. In one embodiment of the present invention, there is comprised: before calculating the threshold based on absolute values of second order differences associated with the standard metrics, normalizing the standard metrics with respect to the at least any one type of the traffic metrics.

Since the value range of each type of traffic metrics varies, e.g., value ranges of CPU usage rate and memory usage rate may be represented as [0-100%] while the value range of network connection may be positive integers describing the number of network connections, a normalization operation may be performed to value ranges of different types of traffic metrics, so that the value range of all traffic metrics is mapped to a plurality of ranks, e.g., rank 1 to rank 8, for further reducing data computations.

FIG. 5B schematically shows a schematic view of normalizing traffic metrics according to one embodiment of the present invention. In this figure, the range of data transmission rates is $0-7 \times 10^6$ bps, so the range is mapped to ranks 1 to 8. For example, 0 bps corresponds to rank 1, while $7 \times 10^6$ bps corresponds to rank 8. In this manner, data computations may further be reduced.

FIG. 5C schematically shows a diagram 500C of calculating the threshold based on absolute values of second order differences associated with the standard metrics. With reference to this figure, detailed description is presented now to how to calculate absolute values of second order differences. In one embodiment of the present invention, an absolute of a second order difference associated with the standard metrics in a time window i-1 is calculated based on an equation below:

$$\text{The absolute value of second order difference} = |2x_i - x_{i-1} - x_{x+1}| \quad \text{Equation 3}$$

Where $x_{i-1}$, $x_i$, $x_{i+1}$ metrics with respect to three neighboring time windows.

According to Equation 3, an absolute value of a second order difference at time point A in FIG. 5C may be calculated, i.e., $=|(5-3)-(3-7)|=6$; an absolute value of a second order difference at time point B in FIG. 5C may be calculated, i.e., $=|(2-7)-(7-3)|=9$. By means of Equation 3, absolute values of second order differences at various time points in FIG. 5C may be calculated.

Figure 6:
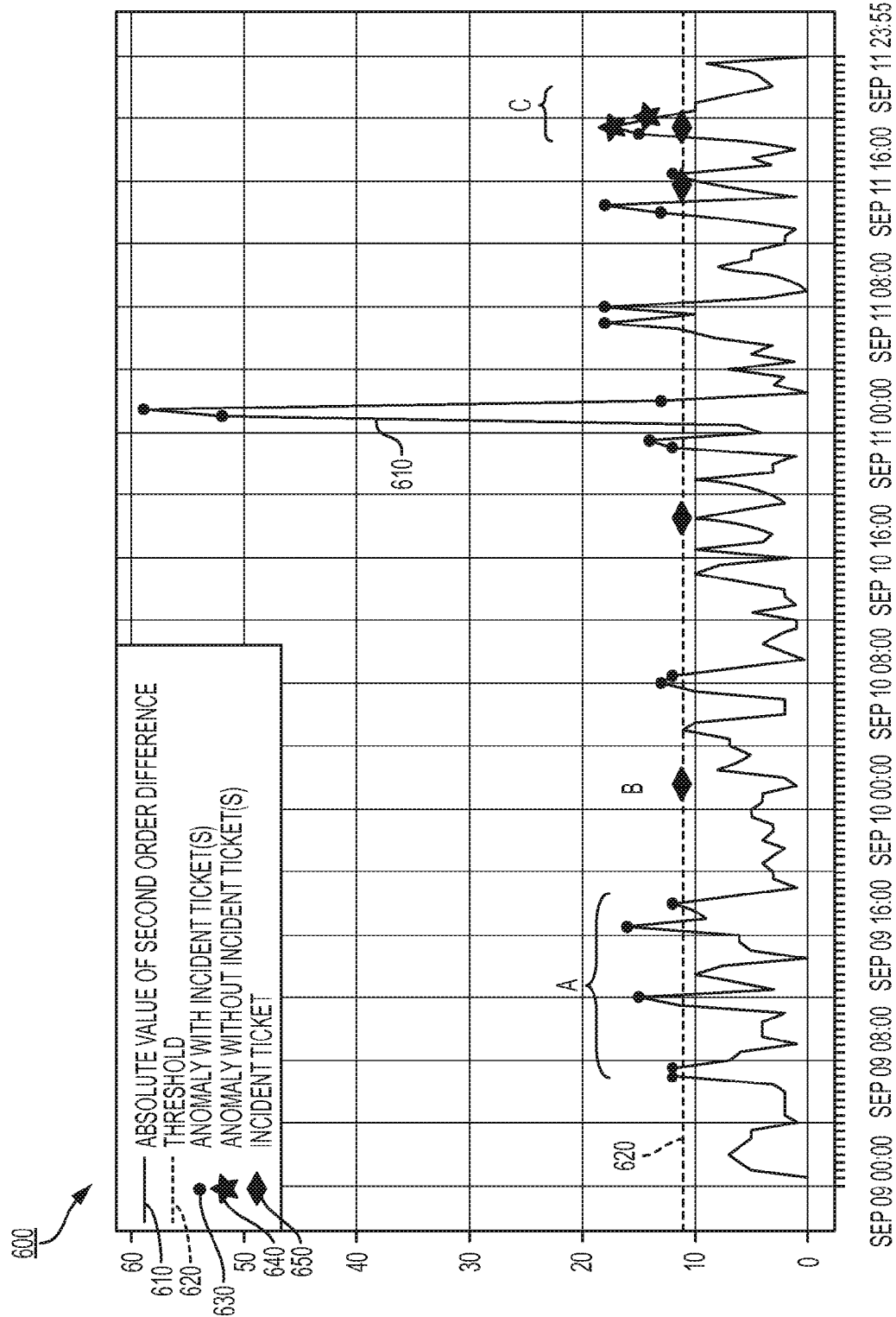
FIG. 6 schematically shows a diagram of calculating a threshold based on absolute values of second order differences associated with traffic metrics according to one embodiment of the present invention.

Next with reference to FIG. 6, this figure schematically shows a diagram 600 of calculating a threshold based on absolute values of second order differences associated with the traffic metrics according to one embodiment of the present invention. As shown in this figure, a curve 610 represents a curve of calculated absolute values of second order differences according to Equation 3 in relation to time. A dashed line 620 represents a threshold being calculated, the threshold meeting when an absolute value of a second order difference associated with the traffic metrics exceeds the threshold, the recall rate $R_{recall}$ that the computer application is recalled is maximized and the precision rate $R_{precision}$ that the computer application is recalled is maximized.

With reference to FIG. 6, description is presented below to a relationship between anomalies and incident tickets. In this figure, dots 630 show anomalies with incident tickets, stars 640 show anomalies without incident ticket, and diamonds show incident tickets 650. In this embodiment, incident tickets with an anomaly mean there is at least one incident ticket within 24 hours after the anomaly. For example, there is an incident ticket (shown by a diamond at time point B) within 24 hours after several anomalies (shown by dots) higher than the threshold in a time period A in FIG. 6, so anomalies in the period A belong to anomalies 630 with incident tickets. In addition, anomalies without incident ticket mean there is no incident ticket within 24 hours after the anomaly. With reference to FIG. 6, anomalies in a time period C belong to anomalies without incident ticket.

As seen from FIG. 6, selected threshold 620 maximizes the recall rate $R_{recall}$ that the computer application is recalled, i.e., except that the two anomalies in the time period C belong to anomalies without incident tickets, all anomalies belong to anomalies with incident tickets. In other words, the computer application and incidents are recalled within 24 hours after the anomaly with an incident ticket. In addition, threshold 620 shown in FIG. 6 maximizes the precision rate $R_{precision}$ that the computer application is recalled when an absolute value of a second order difference associated with the traffic metrics exceeds the threshold. As seen from FIG. 6, there is at least one anomaly within 24 hours before each incident ticket, so at this point the precision rate $R_{precision}$ is maximized, i.e., reaches 90%.

Hereinafter, detailed description is presented to how to determine a threshold. In one embodiment of the present invention, the calculating a threshold based on absolute values of second order differences associated with the traffic metrics comprises: calculating $$F_\beta = (1 + \beta^2) \cdot \frac{R_{precision} \cdot R_{recall}}{\beta^2 \cdot R_{precision} + R_{recall}},$$

where β is a weighting factor describing a weight between the precision rate $R_{precision}$ and the recall rate $R_{recall}$; and a value maximizing $F_\beta$ is set as the threshold.

In mathematical calculation, it is not easy to calculate a threshold that maximizes both the precision rate $R_{precision}$ and the recall rate $R_{recall}$. Therefore, the function $F_\beta$ associated with both the precision rate $R_{precision}$ and the recall rate $R_{recall}$ is calculated using the above method; during calculation, as long as a threshold maximizing the function $F_\beta$, these two values can be maximized. Specifically, in the function $F_\beta$, β is a weighting factor describing a weight between the precision rate $R_{precision}$ and the recall rate $R_{recall}$. Usually, β=1, which indicates the precision rate $R_{precision}$ and the recall rate $R_{recall}$ are equally important; if β=2, this indicates a weight of the recall rate $R_{recall}$ is higher than a weight of the precision rate $R_{precision}$; if β=0.5, this indicates a weight of the recall rate $R_{recall}$ is lower than a weight of the precision rate $R_{precision}$. Those skilled in the art may set a value of β according to the preference for the precision rate $R_{precision}$ and the recall rate $R_{call}$.

A threshold $T_S$ may be calculated through the following:
1) setting $T_S=1$ (at this point the recall rate equals 1), calculating the maximum recall rate $r_1$ and using it as the maximum value of the recall rate; setting the minimum value of the recall rate as $r_{min}$;

2) using a bisection method to find an initial threshold range $[T_S^{min}, T_S^{max}]$, so when $T_S=T_S^{min}$, the recall rate is equal to $r_1$, and when $T_S=T_S^{max}$, the recall rate is equal to $r_{min}$;

3) regarding all $T_S$ within the initial threshold range $[T_S^{min}, T_S^{max}]$, finding $T_S^{opt}$ that maximizes $F_\beta$, at which point $T_S^{opt}$ is the threshold that maximizes the above two values.

By the above method, it is possible to obtain a threshold that maximizes the recall rate $R_{recall}$ the computer application is recalled and maximizes the precision rate $R_{precision}$ precision the computer application is recalled. In subsequent operations, the threshold may be used as a demarcation point judging whether anomalies occur in the traffic metrics. When judging whether anomalies occur in a next time period, first it is necessary to calculate an absolute value of a second order difference associated with the predicted metrics in a next time period as obtained according to the above method.

In one embodiment of the present invention, an absolute value of a second order difference associated with the predicted metrics is calculated based on: aggregating the predicted metrics according to the predetermined time window interval so as to form standard predicted metrics $y_{i+1}$ with respect to a time window i+1; calculating an absolute value of a second order difference associated with the standard predicted metrics $y_{i+1}$ based on $|2x_i - x_{i-1} - y_{i+1}|$. In this embodiment, the method for calculating an absolute value of a second order difference associated with the predicted metrics is similar to the above calculation method based on Equation 3 as described with reference to FIG. 5C; a difference is that at this point the standard predicted metrics $y_{i+1}$ (i.e., predicted values of traffic metrics with respect to the event window i+1) with respect to the time window i+1 replaces the standard metrics with respect to the time window i+1 in Equation 3.

In the embodiments of the present invention, there exist various types of traffic metrics. Therefore, a corresponding threshold may be obtained with respect to each predicted metrics, and judgment is made based on the threshold as to whether potential anomalies exist in each type of traffic metrics. Those skilled in the art may define a policy according to a specific application environment.

In one embodiment of the present invention, the predicting potential anomalies of the computer application in the next time period in response to an absolute value of a second order difference associated with the predicted metrics exceeding the threshold comprises: predicting the potential anomalies in response to at least one of: with respect to at least one predetermined type among the types, an absolute value of a second order difference associated with predicted metrics of the at least one predetermined type exceeding the threshold; and with respect to at least one part of types among the plurality of types, an absolute value of a second order difference associated with predicted metrics of the at least one part of types.

For example, suppose 10 traffic metrics associated with CPU can be monitored, and it is found based on past experience that the probability of CPU faults is quite high when anomalies occur in one or more specific types of traffic metrics (e.g., CPU temperature), then it may be defined that potential anomalies occur when anomalies occur in the above one or more traffic metrics among the 10 traffic metrics. For another example, no predetermined type may be set, but it is defined that potential anomalies occur when anomalies occur in 6 (or other number) of the 10 traffic metrics.

It should be noted that as time elapses, data previously predicted with respect to a next time period may be verified by data actually detected in the next time period, and a previously built prediction model (i.e., threshold) may be adjusted based on the actually detected data. In one embodiment of the present invention, the method for predicting anomalies in a computer application further comprises: detecting running status of the computer application in a next time period; and comparing the running status with potential anomalies so as to adjust the threshold.

Specifically, potential anomalies with respect to a time period j+1 may be predicted in a time period j; as time elapses, e.g., when current time enters the time period j+1, running status of the computer application in the time period j+1 can be detected actually. At this point, a comparison is made as to see whether the running status coincides with potential anomalies, and further an anomaly prediction model (i.e., threshold) may be adjusted based on the comparison result. In this manner, as time elapses, a value of threshold may be adjusted in increments, to provide a more precise prediction method.

Detailed description has been presented above to details of the method for predicting anomalies in a computer application with reference to FIGS. 2 to 6. Those skilled in the art should note the purpose of predicting anomalies in traffic metrics of the computer application is to judge, based on the predicted anomalies, whether or not potential incidents will occur in the computer application in a future time period. Therefore, according to another embodiment of the present invention, there is further provided a method for predicting incidents in a computer application.

Specifically, the method comprises: during runtime of the computer application detecting anomalies and incident tickets associated with the computer application; building an incident prediction model based on the anomalies and the incident tickets, the incident prediction model describing an association rule among the anomalies and the incident tickets; predicting potential anomalies of the computer application in a next time period according to the above method; and predicting potential incidents of the computer application in the next time period based on the incident prediction model and the potential anomalies.

Figure 7:
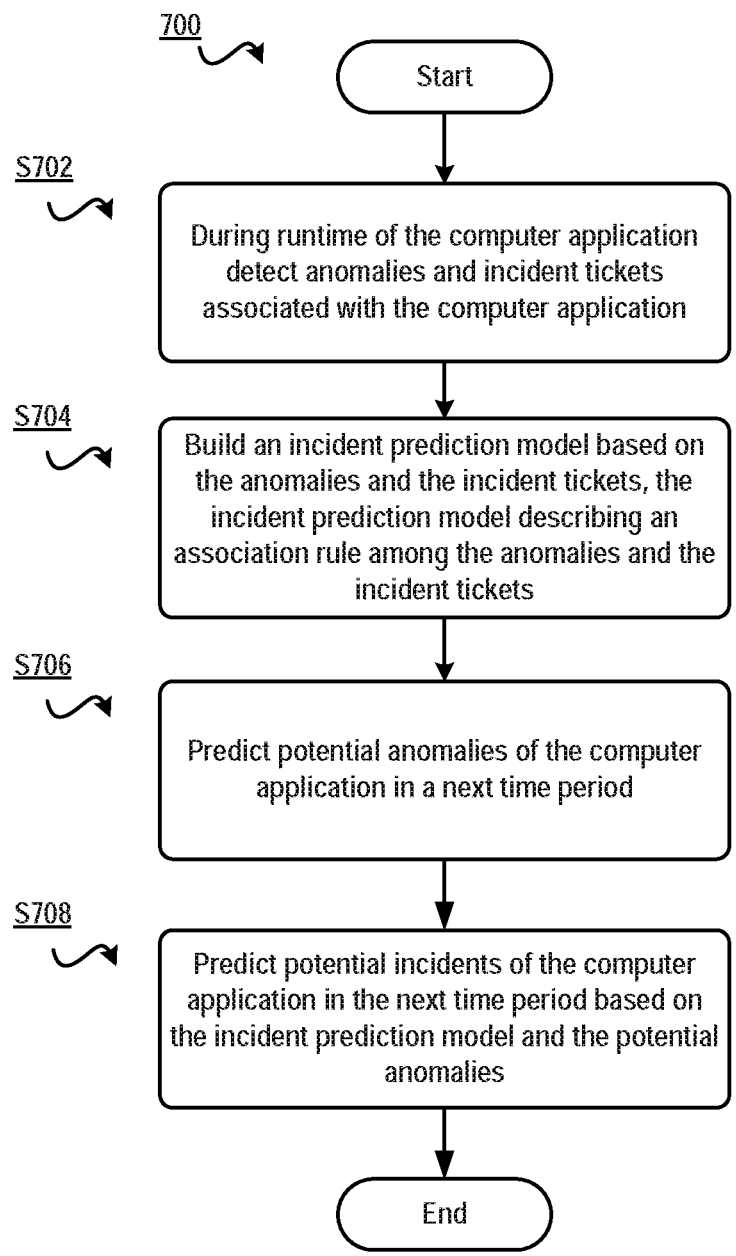
FIG. 7 schematically shows a flowchart of a method for predicting incidents in a computer application according to one embodiment of the present invention.

FIG. 7 schematically shows a flowchart 700 of a method for predicting incidents in a computer application according to one embodiment of the present invention. Specifically, in block S702 anomalies and incident tickets associated with the computer application are detected during runtime of the computer application. In this embodiment, during runtime of the computer application, anomalies and incident tickets may be recorded in real time and saved in a database.

In block S704, an incident prediction model is built based on the anomalies and the incident tickets, the incident prediction model describing an association rule among the anomalies and the incident tickets. Data mining may be used to analyze the association rule among the anomalies and the incident tickets. Detailed implementation modes of data mining are not detailed here, and those skilled in the art may implement a concrete algorithm according to concrete needs.

In block S706, potential anomalies of the computer application in a next time period are predicted using the above method. Illustration has been presented above to how to predict potential anomalies by way of example. An operation may be performed according to the above method in this step and is not detailed here.

In block S708, potential incidents of the computer application in the next time period are predicted based on the incident prediction model and the potential anomalies. Since an incident prediction model describing an association rule among the anomalies and the incident tickets has been obtained in block S704, potential incidents in the next time period can be predicted based on the potential anomalies with respect to the next time period and the incident prediction model.

In one embodiment of the present invention, there is further comprised: detecting running status of the computer application in the next time period; and comparing the running status with the potential incidents to adjust the incident prediction model.

Like the above method for adjusting the anomaly prediction model, in the embodiments of the present invention, parameters in the incident prediction model may be adjusted in a similar way. Specifically, potential incidents with respect to a time period j+1 may be predicted in a time period j; as time elapses, e.g., when current time enters the time period j+1, running status of the computer application in the time period j+1 may be detected in real time. At this point, a comparison is made as to see whether the running status coincides with the potential incidents, and further the incident prediction model may be adjusted according to the comparison result.

Figure 8A:
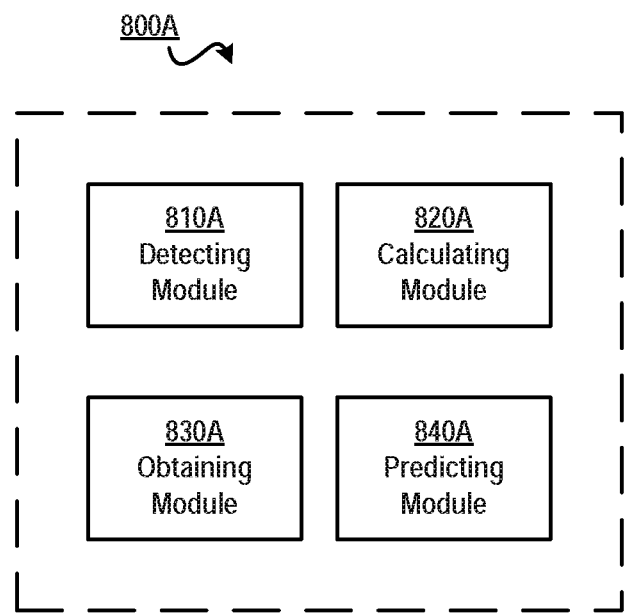
FIGS. 8A and 8B schematically show schematic views of an apparatus for predicting anomalies in a computer application according to one embodiment of the present invention and an apparatus for predicting incidents in a computer application according to one embodiment of the present invention, respectively.
Figure 8B:
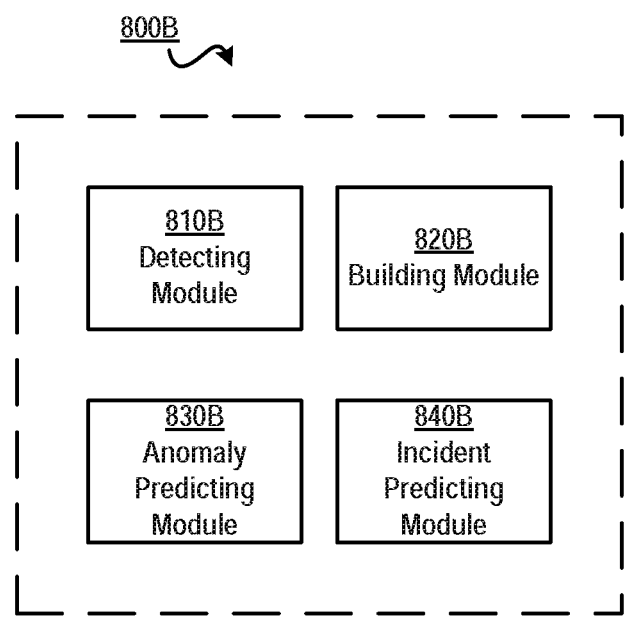

FIGS. 8A to 8B schematically show schematic views 800A and 800B of an apparatus for predicting anomalies in a computer application according to one embodiment of the present invention and an apparatus for predicting incidents in a computer application according to one embodiment of the present invention, respectively. As shown in FIG. 8A, there is provided an apparatus for predicting anomalies in a computer application, comprising: a detecting module 810A configured to, during runtime of the computer application, detect traffic metrics and incident tickets associated with the computer application, the incident ticket indicating an incident might occur in the computer application; a calculating module 820A configured to calculate a threshold based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized, the recall rate $R_{recall}$ describing the ratio of the number of incident tickets causing the computer application to be recalled to the total number of the incident tickets; an obtaining module 830A configured to obtain predicted metrics of the computer application in a next time period based on the traffic metrics; and a predicting module 840A configured to, in response to an absolute value of a second order difference associated with the predicated metrics exceeding the threshold, predict potential anomalies of the computer application in the next time period.

In one embodiment of the present invention, the threshold is such that when an absolute value of a second order difference associated with the traffic metrics exceeds the threshold, a precision rate $R_{precision}$ that the computer application is recalled is maximized, the precision rate $R_{precision}$ describing the ratio of the number of anomalies causing the computer application to be recalled to the number of all anomalies of the computer application.

In one embodiment of the present invention, calculating module 820A comprises: an aggregating module configured to aggregate the traffic metrics according to a predetermined time window interval so as to form standard metrics; and a threshold calculating module configured to calculate the threshold based on absolute values of second order differences associated with the standard metrics.

In one embodiment of the present invention, the traffic metrics comprise at least any one type of: CPU usage rate, memory usage rate, workload, network connection and data transmission rate.

In one embodiment of the present invention, there is comprised: a normalizing module configured to, before calculating the threshold based on absolute values of second order differences associated with the standard metrics, normalize the standard metrics with respect to the at least any one type of the traffic metrics.

In one embodiment of the present invention, an absolute of a second order difference associated with the standard metrics in a time window i−1 is calculated based on an equation below: $|2x_i - x_{i-1} - x_{i+1}|$, where $x_{i-1}$, $x_i$, $x_{i+1}$ represent standard metrics with respect to three neighboring time windows.

In one embodiment of the present invention, the calculating module comprises: a $F_\beta$ calculating module configured to calculate $$F_\beta = (1+\beta^2) \cdot \frac{R_{precision} \cdot R_{recall}}{\beta^2 \cdot R_{precision} + R_{recall}},$$

where β is a weighting factor describing a weight between the recall rate $R_{recall}$ and the precision rate $R_{precision}$; and a setting module configured to set a value maximizing $F_\beta$ as the threshold.

In one embodiment of the present invention, an absolute value of a second order difference associated with the predicted metrics is calculated based on: aggregating the predicted metrics according to the predetermined time window interval so as to form standard predicted metrics $y_{i+1}$ with respect to a time window i+1; and calculating an absolute value of a second order difference associated with the standard predicted metrics $y_{i+1}$ based on $|2x_i - x_{i-1} - x_{i+1}|$.

In one embodiment of the present invention, predicting module 840A comprises: a first predicting module configured to, with respect to at least one predetermined type among the types, predict the potential anomalies in response to an absolute value of a second order difference associated with predicted metrics of the at least one predetermined type exceeding the threshold; and a second predicting module configured to, with respect to at least one part of types among the plurality of types, predict the potential anomalies in response to an absolute value of a second order difference associated with predicted metrics of the at least one part of types exceeding the threshold.

In one embodiment of the present invention, there is further comprised: a status detecting module configured to detect running status of the computer application in the next time period; and an adjusting module configured to compare the running status with the potential anomalies to adjust the threshold.

As shown in FIG. 8B, there is provided an apparatus for predicting incidents in a computer application, comprising: a detecting module 810B configured to, during runtime of the computer application detect anomalies and incident tickets associated with the computer application; a building module 820B configured to build an incident prediction model based on the anomalies and the incident tickets, the incident prediction model describing an association rule among the anomalies and the incident tickets; an anomaly predicting module 830B comprising the modules with reference to FIG. 8A and configured to predict potential anomalies of the computer application in a next time period; and an incident predicting module 840B configured to predict potential incidents of the computer application in the next time period based on the incident prediction model and the potential anomalies.

In one embodiment of the present invention, there is further comprised: a status detecting module configured to detect running status of the computer application in the next time period; and a comparing module configured to compare the running status with the potential incidents to adjust the incident prediction model.

By means of the methods and apparatuses of the present invention, anomalies and incidents that might occur in the computer application in future runtime can be predicted more rapidly and precisely while historical traffic metrics and incident tickets of the computer application in previous runtime are taken into full consideration.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for predicting anomalies in a computer application, the apparatus comprising a processor configured to execute a plurality of software modules, the modules comprising:
   a detecting module configured to, during runtime of the computer application, detect traffic metrics and incident tickets associated with the computer application, the incident ticket indicating an incident might occur in the computer application;
   a calculating module configured to calculate a threshold based on absolute values of second order differences associated with the traffic metrics, wherein the threshold is such that when the absolute value of the second order difference associated with the traffic metrics exceeds the threshold, a recall rate $R_{recall}$ that the computer application is recalled is maximized, the recall rate $R_{recall}$ describing a ratio of the number of incident tickets causing the computer application to be recalled to the total number of the incident tickets;

an obtaining module configured to obtain predicted metrics of the computer application in a next time period based on the traffic metrics; and a predicting module configured to, in response to an absolute value of a second order difference associated with the predicted metrics exceeding the threshold, predict potential anomalies of the computer application in the next time period.

2. The apparatus according to claim 1, wherein the threshold is such that when the absolute value of the second order difference associated with the traffic metrics exceeds the threshold, a precision rate $R_{precision}$ that the computer application is recalled is maximized, the precision rate $R_{precision}$ describing a ratio of the number of anomalies causing the computer application to be recalled to the number of all anomalies of the computer application.

3. The apparatus according to claim 2, wherein the calculating module comprises:

an aggregating module configured to aggregate the traffic metrics according to a predetermined time window interval so as to form standard metrics; and a threshold calculating module configured to calculate the threshold based on absolute values of second order differences associated with the standard metrics.

4. The apparatus according to claim 3, wherein the traffic metrics comprise at least any one type of: CPU usage rate, memory usage rate, workload, network connection and data transmission rate.

5. The apparatus according to claim 4, further comprising:

a normalizing module configured to, before calculating the threshold based on the absolute values of the second order differences associated with the standard metrics, normalize the standard metrics with respect to the at least any one type of the traffic metrics.

6. The apparatus according to claim 5, wherein an absolute of a second order difference associated with the standard metrics in a time window i−1 is calculated based on an equation below: $|2x_i - x_{i-1} - x_{i+1}|$, where $x_{i-1}$, $x_i$, $x_{i+1}$ represent standard metrics with respect to three neighboring time windows.

7. The apparatus according to claim 2, wherein the calculating module comprises:

a $F_\beta$ calculating module configured to calculate $$F_\beta = (1+\beta^2) \cdot \frac{R_{precision} \cdot R_{recall}}{\beta^2 \cdot R_{precision} + R_{recall}},$$

where β is a weighting factor describing a weight between the recall rate $R_{recall}$ and the precision rate $R_{precision}$; and a setting module configured to set a value maximizing $F_\beta$ as the threshold.

8. The apparatus according to claim 6, wherein the absolute value of the second order difference associated with the predicted metrics is calculated based on:

aggregating the predicted metrics according to the predetermined time window interval so as to form standard predicted metrics $y_{i+1}$ with respect to a time window i+1; and calculating an absolute value of a second order difference associated with the standard predicted metrics $y_{i+1}$ based on $|2x_i - x_{i-1} - y_{i+1}|$.

9. The apparatus according to claim 8, wherein the predicting module comprises:

a first predicting module configured to, with respect to at least one predetermined type among the types, predict the potential anomalies in response to an absolute value of a second order difference associated with predicted metrics of the at least one predetermined type exceeding the threshold; and a second predicting module configured to, with respect to at least one part of types among the plurality of types, predict the potential anomalies in response to an absolute value of a second order difference associated with predicted metrics of the at least one part of types exceeding the threshold.

10. An apparatus for predicting incidents in a computer application, comprising a processor configured to execute a plurality of software modules, the modules comprising:

a detecting module configured to, during runtime of the computer application, detect anomalies and incident tickets associated with the computer application;

a building module configured to build an incident prediction model based on the anomalies and the incident tickets, the incident prediction model describing an association rule among the anomalies and the incident tickets;

an anomaly predicting module comprising modules as recited in claim 1 and configured to predict potential anomalies of the computer application in a next time period; and an incident predicting module configured to predict potential incidents of the computer application in the next time period based on the incident prediction model and the potential anomalies.

\* \* \* \* \*